United States Patent
Wehr et al.

(10) Patent No.: US 7,137,497 B2
(45) Date of Patent: Nov. 21, 2006

(54) MEANS FOR SECURING A CAGE OF A FREEWHEEL AGAINST ROTATION

(75) Inventors: Daniel Wehr, Muhlhausen (DE); Heinz Pfann, Erlangen (DE)

(73) Assignee: Ina-Schaeffler KG (DE)

( * ) Notice: Subject to any disclaimer, the term of this patent is extended or adjusted under 35 U.S.C. 154(b) by 121 days.

(21) Appl. No.: 10/965,617

(22) Filed: Oct. 14, 2004

(65) Prior Publication Data

US 2005/0050983 A1    Mar. 10, 2005

Related U.S. Application Data

(63) Continuation of application No. PCT/EP03/02893, filed on Mar. 20, 2003.

(30) Foreign Application Priority Data

Apr. 17, 2002   (DE)   ................ 102 16 957

(51) Int. Cl.
*F16D 41/06*   (2006.01)
(52) U.S. Cl. ....................................... 192/45
(58) Field of Classification Search ........... 192/45
See application file for complete search history.

(56) References Cited

U.S. PATENT DOCUMENTS

| | | | |
|---|---|---|---|
| 3,087,588 A | 4/1963 | Fischer | 192/45 |
| 3,118,526 A | 1/1964 | Fischer | 192/45 |
| 3,718,212 A * | 2/1973 | Havranek | 192/45 |
| 4,106,602 A | 8/1978 | Dieckermann | 192/45 |
| 5,014,833 A * | 5/1991 | Johnston | 192/45 |
| 5,273,144 A * | 12/1993 | Papania | 192/45 |
| 5,617,937 A * | 4/1997 | Zettner et al. | 192/45 |
| 5,667,046 A | 9/1997 | Stanton et al. | 192/45 |
| 2001/0045334 A1 | 11/2001 | Aida et al. | 192/45 |

FOREIGN PATENT DOCUMENTS

| | | |
|---|---|---|
| CH | 435 876 | 5/1967 |
| DE | 1 258 207 | 1/1968 |
| DE | 2 251 629 | 1/1974 |
| DE | 33 21 358 A1 | 12/1984 |
| DE | 44 42 404 C2 | 6/1996 |
| DE | 196 26 959 A1 | 1/1998 |
| FR | 2 474 121 | 7/1981 |
| GB | 1 598 897 | 9/1981 |

OTHER PUBLICATIONS

International Search Report dated Jun. 11, 2003.
German Search Report dated Apr. 17, 2002.

* cited by examiner

*Primary Examiner*—Saul Rodriguez
(74) *Attorney, Agent, or Firm*—Ostrolenk, Faber, Gerb & Soffen, LLP

(57) ABSTRACT

A freewheel having inner and outer machine parts which are rotatable with respect to one another about an axis. One machine part has a smooth cylindrical clamping track, and the other machine part is provided on its circumferential face facing the smooth cylindrical clamping track with clamping ramps arrayed in the circumferential direction. A metallic cage has a series of profiled transverse webs positively locked for preventing rotation with respect to the other machine part. The cage has a central web section that extends parallel to the axis of the freewheel and is connected to two obliquely extending connecting web sections at the ends of the central section. Each oblique web section is connected to an outer web section which also extends parallel to the axis.

10 Claims, 8 Drawing Sheets

MEANS FOR SECURING A CAGE OF A FREEWHEEL AGAINST ROTATION

CROSS REFERENCE TO RELATED APPLICATION

This is a continuation of International Application No. PCT/EP03/02893, filed Mar. 20, 2003, published in the German language at WO 03/087610, which claims priority from German application No. 102 16 957.8 filed Apr. 17, 2002.

BACKGROUND OF THE INVENTION

The invention relates to a freewheel having two machine parts which are arranged one inside the other and can be rotated with respect to one another about an axis. One machine part is a smooth cylindrical clamping track and the other machine part is provided on its circumferential face facing the smooth cylindrical clamping track with clamping ramps which follow one another in the circumferential direction. It has a cage which is arranged between the machine parts and which is formed from rims and webs which connect these rims to one another, and pockets for clamping rollers which are sprung against the smooth cylindrical clamping track. The clamping ramps are formed between webs which are adjacent to one another at the circumference. The cage forms, with the other machine part, a positively locking connection in order to secure it against rotation with respect to this other machine part.

Such a clamping roller freewheel is known, for example, from DE 44 42 404 C2. This freewheel has a smooth cylindrical cage which is made of plastic and which is arranged between an outer sleeve and an inner sleeve and holds clamping rollers in its pockets which are formed by webs. The circumferential faces, facing one another, of the two sleeves have inner and outer raceways, the inner raceway being provided with clamping ramps. Between adjacent clamping ramps of the inner raceway, axial grooves are provided, into which radial projections of the cage, which are integrally formed on, engage in a positively locking fashion in such a way that this plastic cage is arranged fixed in terms of rotation with respect to the inner sleeve. These projections are integrally formed on to the inner diameter of the cage as knobs.

A disadvantage here is that this plastic cage has a low degree of stability and only has a very small lubricant reservoir space. As a result the plastic knobs which are integrally formed on may shear off from the internal diameter so that the cage cannot be positioned correctly. It is also disadvantageous that the process of mounting the freewheeling unit is made more difficult owing to the large number of projections which are integrally formed on and which engage in the axial groove.

SUMMARY OF THE INVENTION

The invention therefore has the object of making available a freewheel of the generic type with a cage which can be positioned axially in a different way from that of the machine part which is provided with the clamping ramps.

According to the invention, this object is achieved by the invention. The freewheel has inner and outer machine parts relatively rotatable around an axis. One machine part has a smooth cylindrical clamping track while the other machine part has an opposing face with a plurality of clamping ramps thereat.

A cage fabricated from a metallic material provided with profiled webs provides a positive locking connection with one machine part for the purpose of securing the cage against rotation with respect to the other machine part. The connection is made by a central web section of the cage which assumes a parallel orientation with respect to the axis of the freewheel and the central web section is connected by two obliquely extending intermediate web sections to two outer web sections which also extend parallel to the axis. The central web section engages in a groove in the facing machine part, or vice versa.

In the known sense, profiled webs is to be understood here to mean that they have sections which extend parallel to the axis of the clamping rollers and extend inside and outside the pitch circle of the clamping rollers and are connected to one another by sections which extend obliquely with respect to the axis of the clamping rollers. Securement against rotation is always provided here by the central web section which has a positive locking connection with one of the machine parts, so that in this way, the cage is fixed in terms of rotation on the machine part.

The advantage of such a cage which is secured in terms of freewheeling is that the cage has a relatively large lubricant reservoir space owing to its webs which are of profiled construction. It is also advantageous that the mounting of the freewheeling unit is simplified since the central web part can easily be positively locked and connected to the associated machine part. Furthermore, the metallic material of the cage provides the cage with a high degree of stability even in the case of small dimensions.

The method of forming a positively locking connection between the cage and the associated machine part is of a projection in groove type. Thus, the central web part engages in an axial groove of the other machine part. In a reversal of the above, the central web part has a recess into which an associated projection from the other machine part engages.

As is apparent, the cage of the freewheel can either be secured to the inner machine part or to the outer machine part. In the first case, the smooth cylindrical clamping track is formed on the outer machine part, and the cage is shaped as an M cage or as a V cage. In the second case, the smooth cylindrical clamping track is embodied on the inner machine part and the cage is shaped as a W or as an A cage.

According to a further feature of the invention, both machine parts are embodied as thin-walled sleeves which are manufactured particularly using a deep drawing method. Such a freewheel can be fabricated in a particularly economic way owing to its manufacture without a cutting process.

The invention is explained in more detail using the exemplary embodiments below.

DETAILED DESCRIPTION OF PREFERRED EMBODIMENTS

Figure 1:
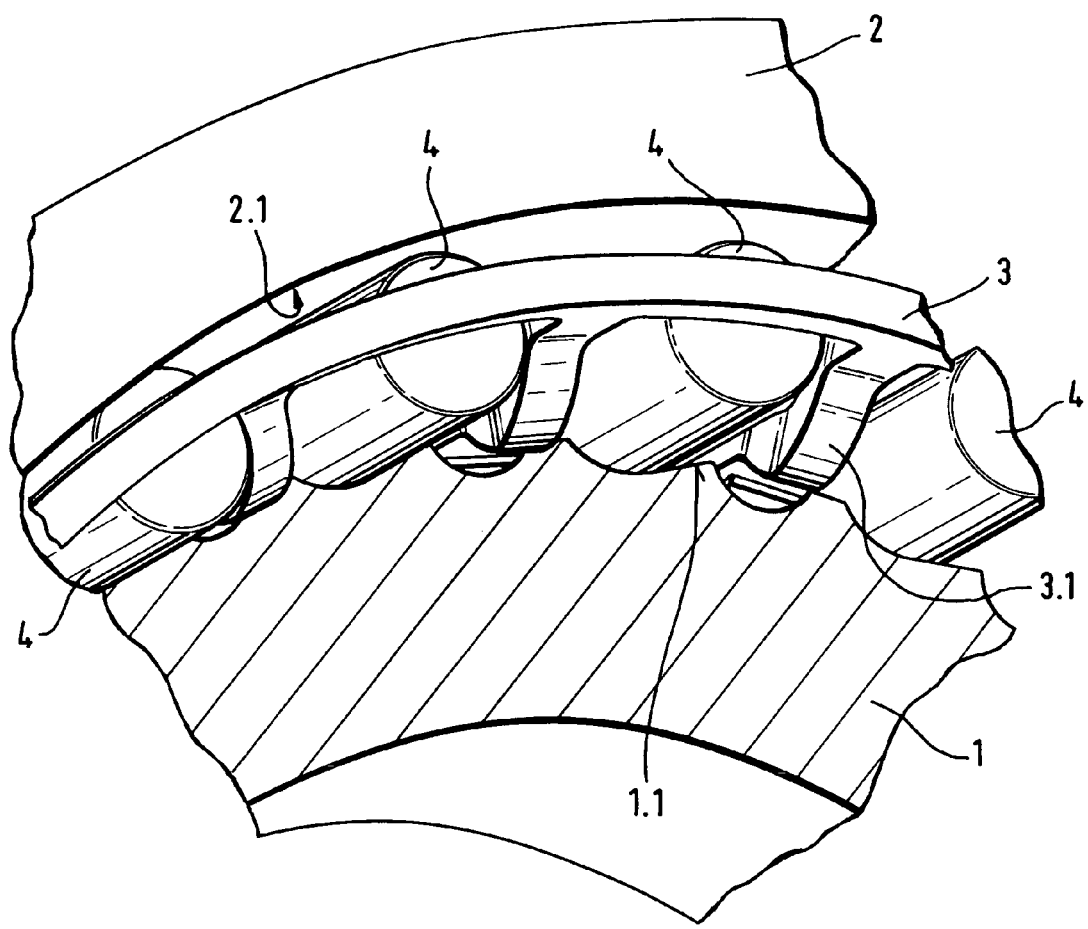
FIGS. 1 and 11 show a detail of a perspective view of a freewheel in a partially sectional representation.
Figure 2:
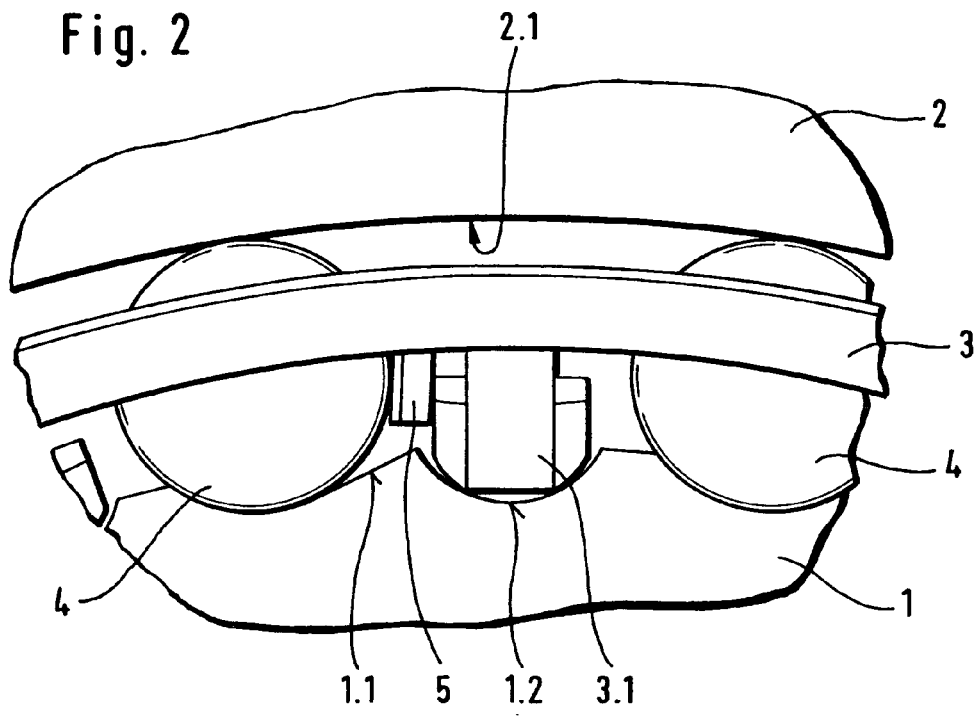
FIGS. 2, 6 and 12 show a side view of a freewheel.
Figure 3:
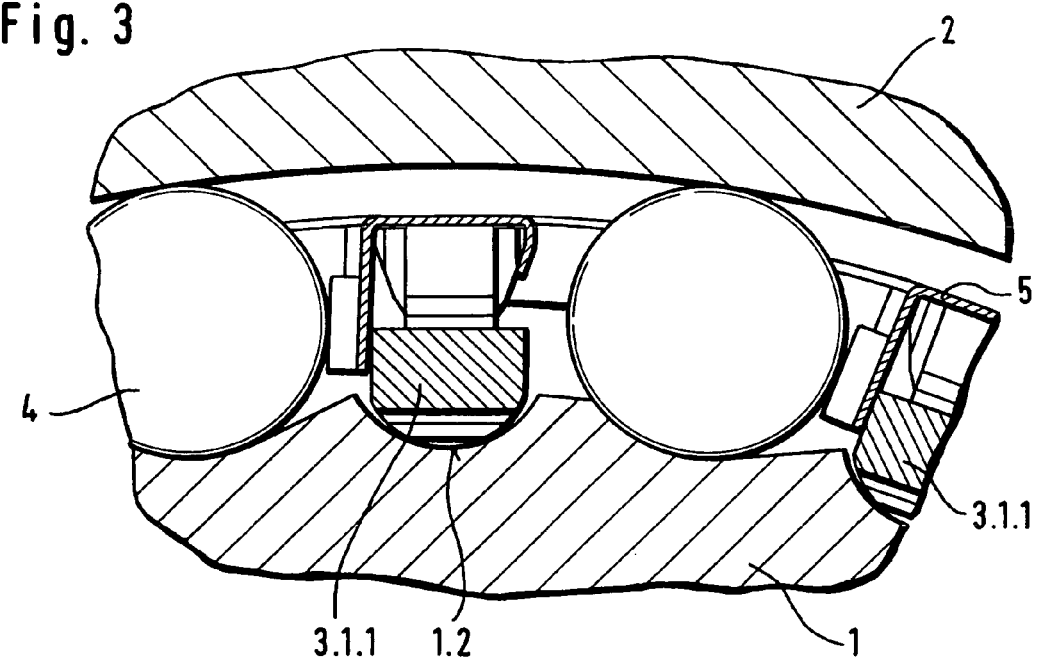
FIGS. 3, 7 and 13 show a cross section through a freewheel.
Figure 4:
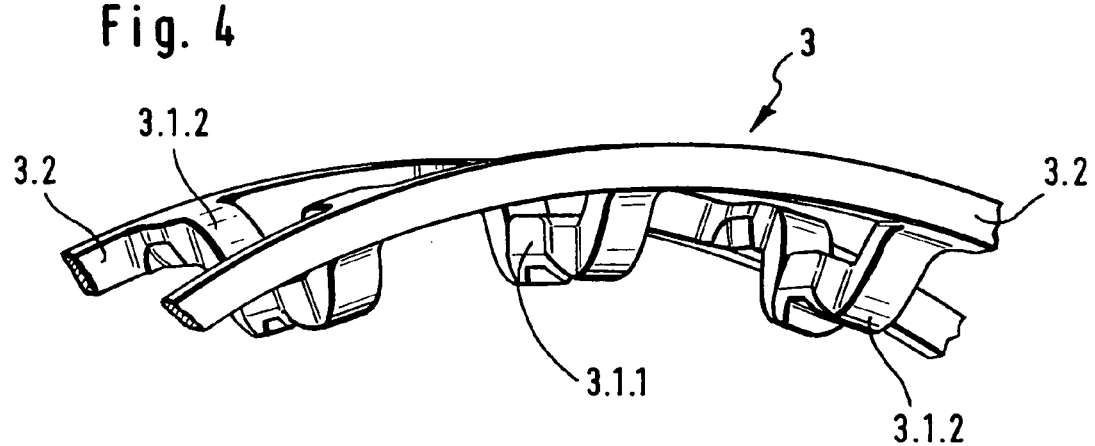
FIGS. 4 and 8 show a detail of a perspective representation of a cage.
Figure 5:
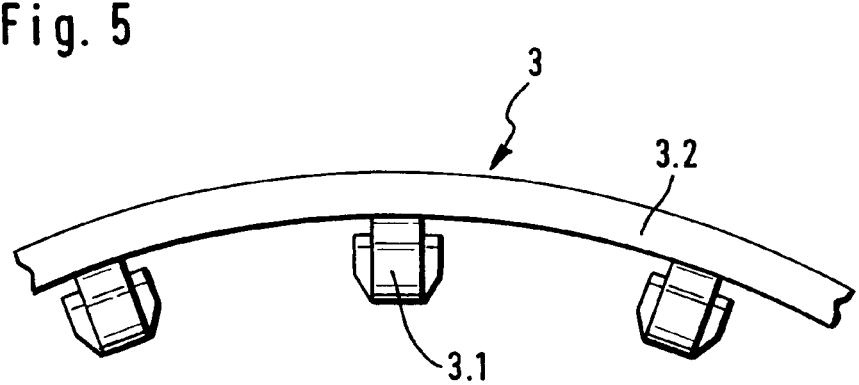
FIGS. 5 and 9 show a detail of a side view of a cage.
Figure 6:
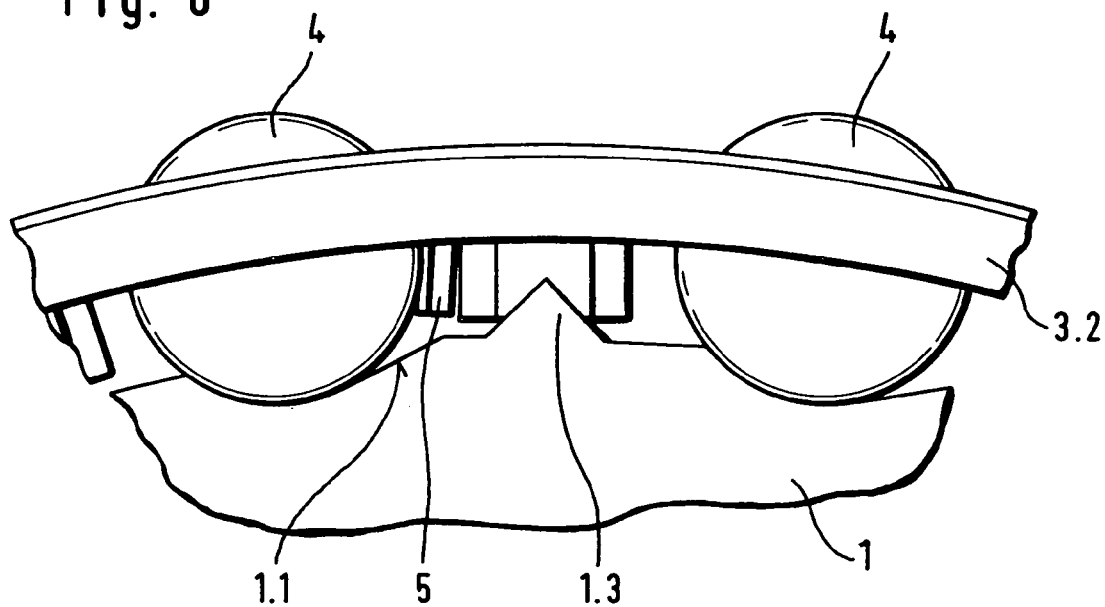
Figure 7:
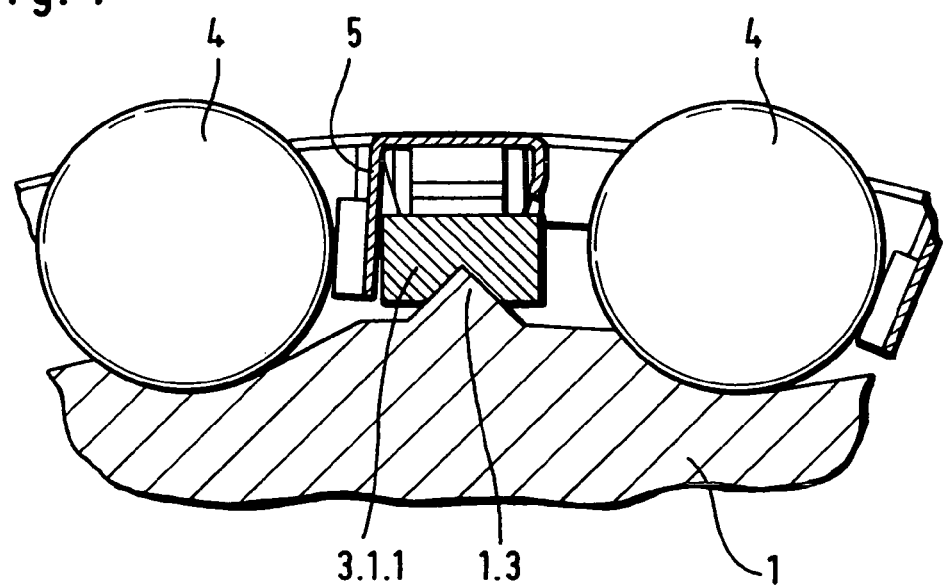
Figure 8:
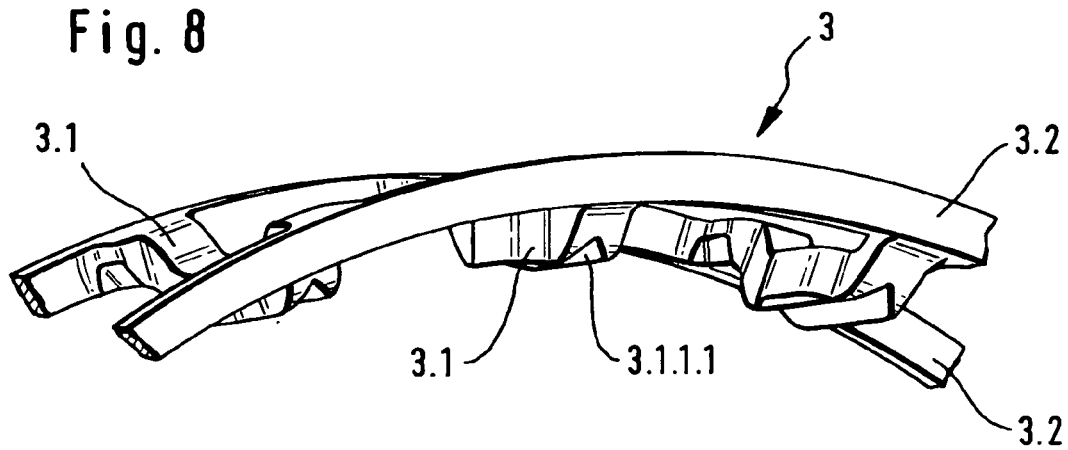
Figure 9:
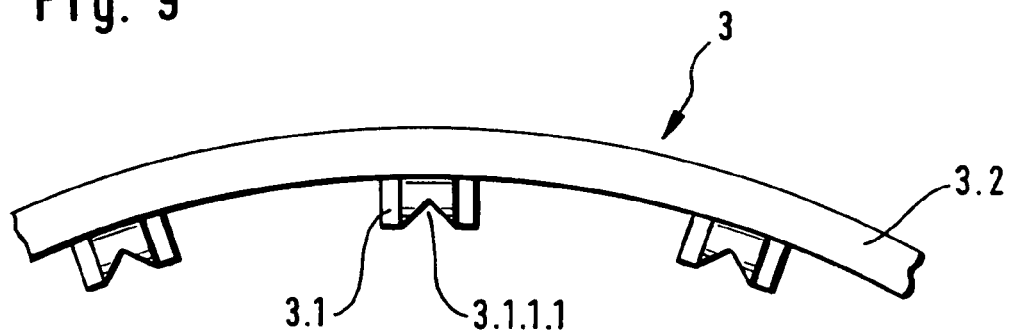

A freewheel illustrated in FIGS. 1, 2 and 3 has an inner machine part 1 and an outer machine part 2 between which a cage 3 is arranged and also clamping rollers 4 which are spaced apart from one another in the circumferential direction and are held in the cage. The outer machine part 2 has a smooth cylindrical clamping track 2.1, while the inner machine part 1 includes clamping ramps 1.1. The clamping rollers 4 are moved into the cage 3 into the clamping position by a spring element 5. As is also shown by the Figures, the cage 3 engages in an axial direction extending groove 1.2 of the inner machine part 1 so that the cage is arranged to be rotatably fixed on the inner machine part 1.

As is shown in particular by FIGS. 2, 3, 4, 5 and 10b, in this example, the cage 3 is embodied as a V-shaped cage having rims 3.2 which are connected to one another by webs 3.1 which are bent at right angles. The webs 3.1 have sections 3.1.1, 3.1.3 which lie inside and outside the pitch circle $R_m$ of the clamping rollers. The central web section 3.1.1 which lies within the pitch circle is connected by two intermediate web sections 3.1.2 which extend obliquely with respect to the axis to the web outer sections 3.1.3, and the latter also extend parallel to the axis. The web sections 3.1.3 lie outside the pitch circle $R_m$ of the clamping rollers. The web 3.1 engages via its central web section 3.1.1 in the axial groove 1.2 of the inner machine part 1 so that the cage 3 is held secured against rotation thereon. The M shaped cage which is shown in FIG. 10a is also provided for the purpose of being secured to the inner machine part 1 and differs from the V cage shown in FIG. 10b only in that the two end rings 3.2 are provided with flanges 3.2.1 which are directed radially inward.

Another type of positive locking connection between the cage 3 and the inner machine part 1 is shown in FIGS. 6, 7, 8 and 9. As is apparent, the central web section 3.1.1 is provided with an inwardly facing, axial groove 3.1.1.1 into which an outward projection 1.3 from the inner machine part 1 engages.

Figures 10A, 10B, 10C, 10D:
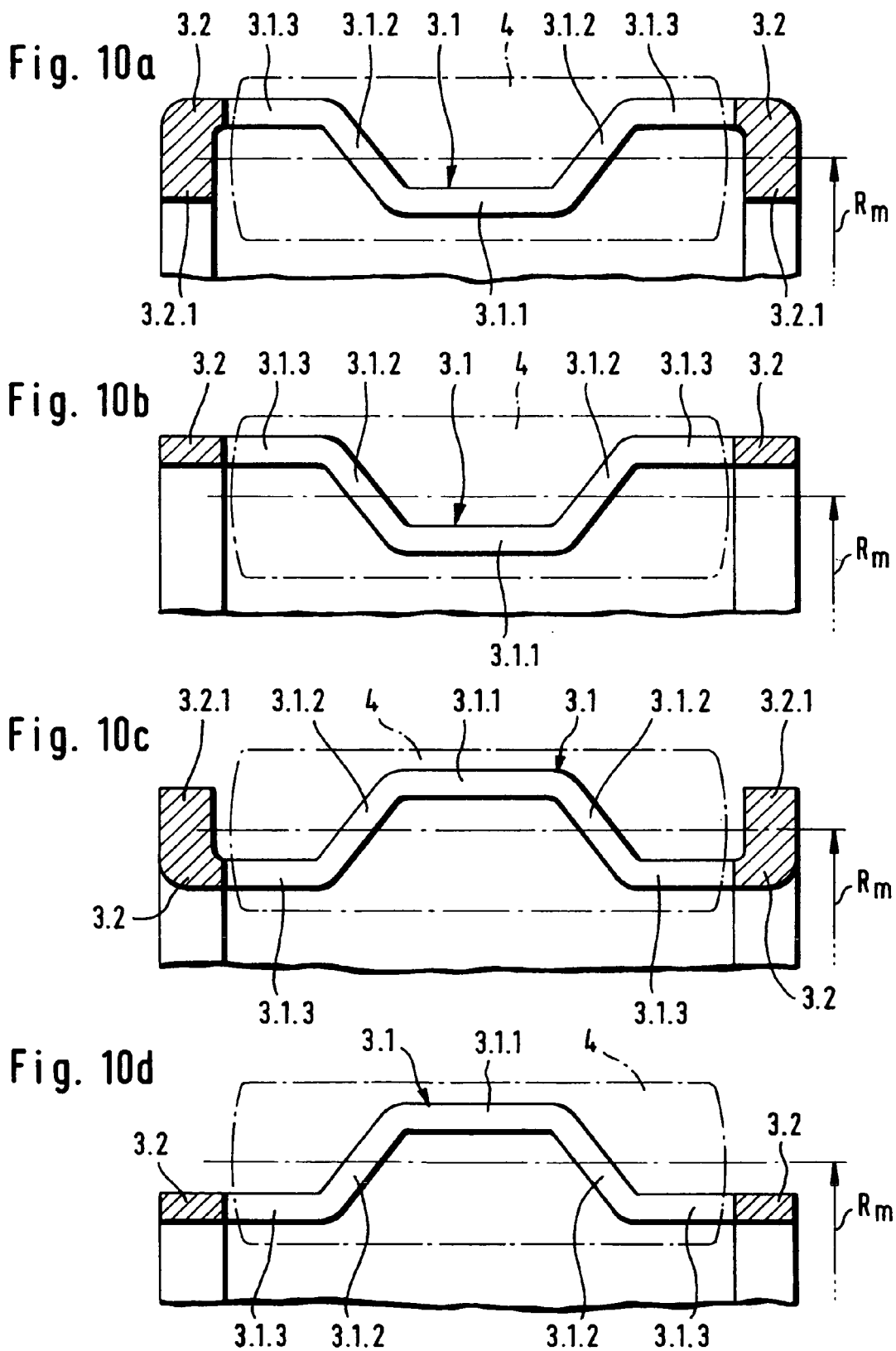
FIGS. 10a, 10b, 10c and 10d show various cage variants in a longitudinal section.
Figure 11:
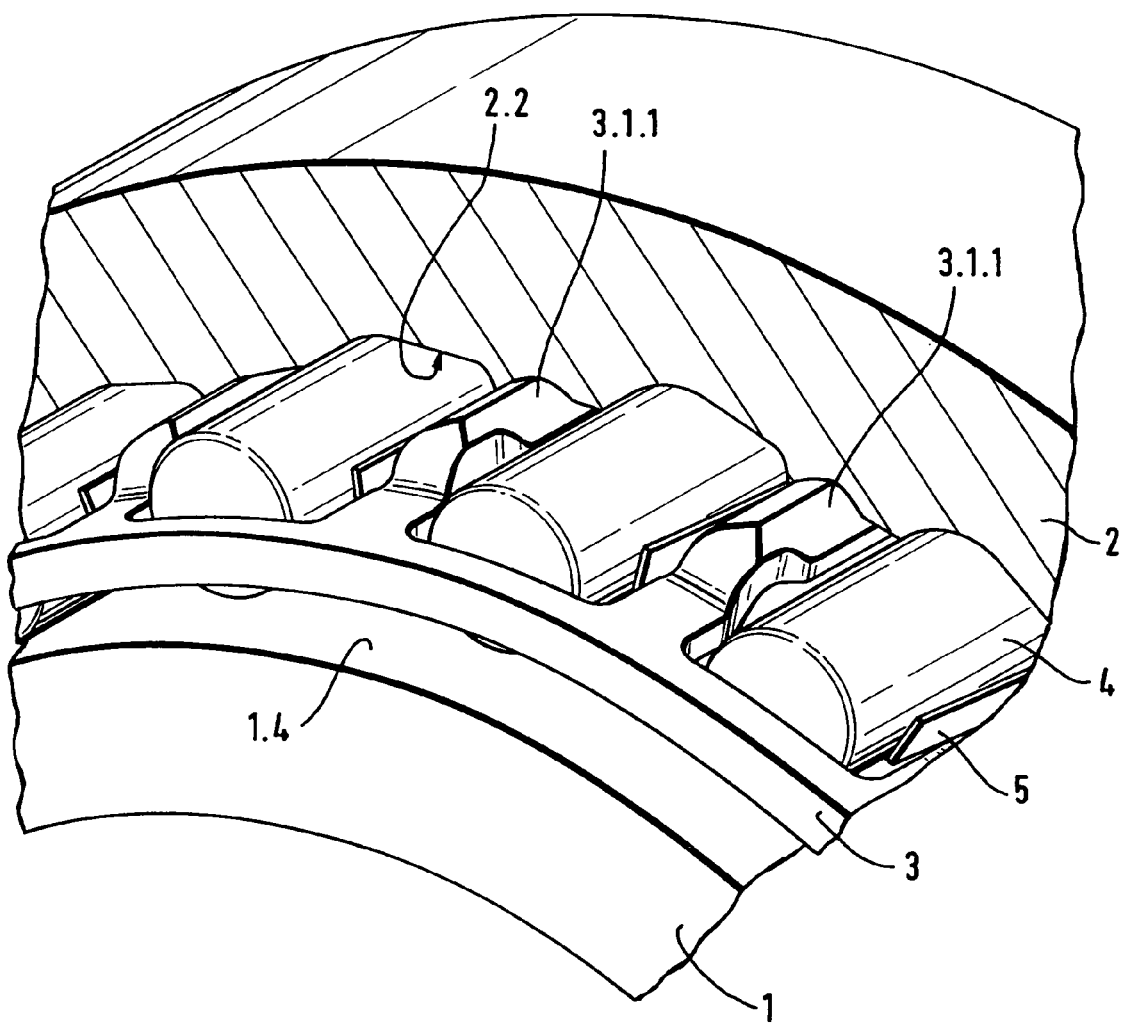
Figure 12:
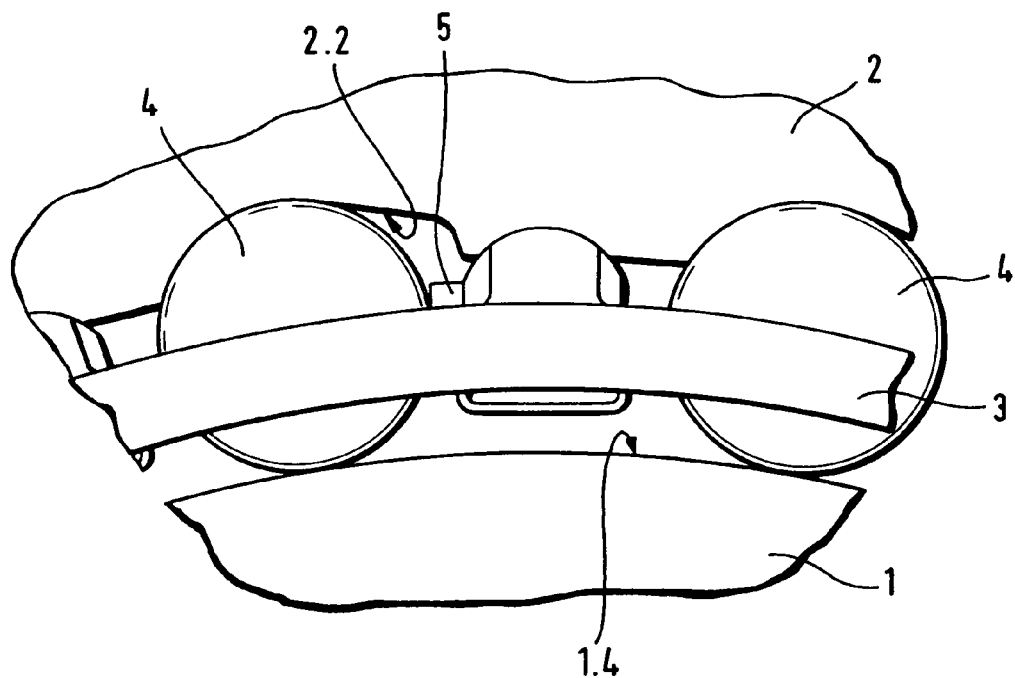
Figure 13:
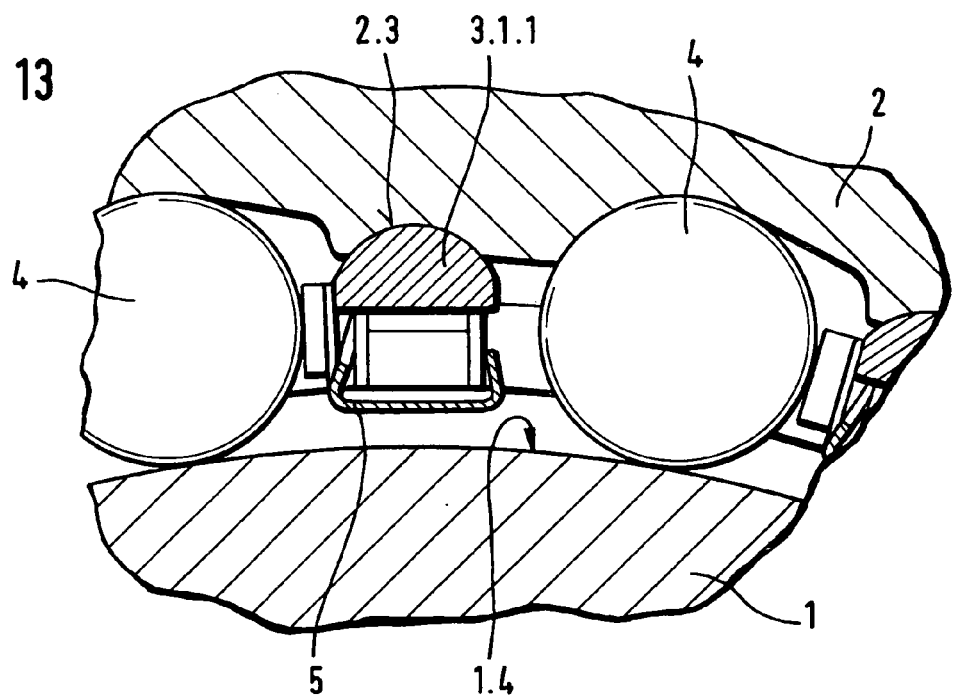

The securing of the cage 3 in the outer machine part 2 is illustrated in FIGS. 11, 12 and 13 in a radially inverted fashion with respect to the arrangement according to FIGS. 1, 2 and 3. In this case, the inner machine part 1 has a smooth cylindrical clamping track 1.4, while the outer machine part 2 has clamping ramps 2.2. The outer machine part 2 has an axial groove 2.3 into which the cage 3 engages via its central web section 3.1.1 and the cage is thus held in a positively locking fashion. The cages 3 which are shown in FIGS. 10c and 10d and which are embodied in the shape of a W and an A, respectively, are associated with this embodiment of the invention. They have a central web section 3.1.1 which is arranged outside the pitch circle $R_m$ of the clamping rollers. This central web section 3.1.1 forms the positive locking connection with the associated outer machine part 2. The W-shaped cage which is shown in FIG. 10c differs from the A-shaped cage shown in FIG. 10d in that the two end rings 3.2 are each provided with a flange 3.2.1 which points outward in the radial direction.

What is claimed is:

1. A freewheel operable to rotate about an axis, comprising:

an inner machine part and an an outer machine part, wherein the machine parts are operable to rotate respectively about the axis, and further wherein the inner machine part is arranged at least partially within the outer machine part, circumferential clamping tracks provided on the inner and the outer parts, wherein the circumferential clamping tracks are radially opposed and spaced apart, and further wherein one of the clamping tracks is smooth;

an array of clamping ramps provided on the circumferential clamping track that opposes the smooth cylindrical clamping track, wherein the clamping ramps are circumferential;

clamping rollers placed between the clamping tracks;

a cage comprising two axially spaced rims and arranged between the machine parts;

a plurality of circumferentially spaced apart webs joining the rims, the webs are profiled and include axially spaced apart and interconnected outer web sections extending parallel to the axis, the clamping ramps are formed between the webs;

pockets included in the cage for the clamping rollers and at least one spring included in each of the webs for springing the clamping rollers against the smooth cylindrical clamping track;

a positive locking connection formed with the cage and one of the machine parts to secure the cage from rotating while the other one of the machine parts rotates the positive locking connection comprises a central web section of the cage that extends parallel to the rotation axis of the freewheel, two intermediate web sections extending obliquely at respective opposite ends of the central web section, and each intermediate web section is placed at a respective one of the outer web sections.

2. The freewheel as claimed in claim 1, wherein the cage is metallic.

3. The freewheel as claimed in claim 1, further comprising an axial groove in one of the machine parts, and the central web section is operable to engage the axial groove.

4. The freewheel as claimed in claim 1, further comprising an axial groove in the central web section and one of the machine parts has an associated projection which engages in the axial groove.

5. The freewheel as claimed in claim 1, wherein the smooth cylindrical clamping track is formed on the outer machine part.

6. The freewheel as claimed in claim 5, wherein the cage is M-shaped or V-shaped, and the central web section is received by the inner machine part.

7. The freewheel as claimed in claim 1, wherein the smooth cylindrical clamping track is formed on the inner machine part.

8. The freewheel as claimed in claim 7, wherein the cage is W-shaped or A-shaped, and the central web section thereof is received by the outer machine part.

9. The freewheel as claimed in claim 1, wherein both the outer and the inner machine parts are thin-walled sleeves.

10. The freewheel as claimed in claim 9, wherein the sleeves are manufactured using a deep drawing method.

* * * * *